US010284910B2

United States Patent
VanBlon et al.

(10) Patent No.: US 10,284,910 B2
(45) Date of Patent: May 7, 2019

(54) POWERING-ON DEVICES BASED ON REMOTE CONTROL MOVEMENT

(71) Applicant: LENOVO (Singapore) PTE. LTD., New Tech Park (SG)

(72) Inventors: Russell Speight VanBlon, Raleigh, NC (US); Nathan J. Peterson, Oxford, NC (US); John Carl Mese, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 15/698,335

(22) Filed: Sep. 7, 2017

(65) Prior Publication Data

US 2019/0075355 A1    Mar. 7, 2019

(51) Int. Cl.
| H04N 21/443 | (2011.01) |
| H04N 21/422 | (2011.01) |
| H04N 21/436 | (2011.01) |
| H04N 21/4363 | (2011.01) |
| H04N 5/44 | (2011.01) |
| G08C 17/02 | (2006.01) |
| G08C 23/04 | (2006.01) |

(52) U.S. Cl.
CPC ......... *H04N 21/4436* (2013.01); *G08C 17/02* (2013.01); *G08C 23/04* (2013.01); *H04N 5/4403* (2013.01); *H04N 21/42222* (2013.01); *H04N 21/43615* (2013.01); *H04N 21/43637* (2013.01); *G08C 2201/32* (2013.01)

(58) Field of Classification Search
None
See application file for complete search history.

(56) References Cited

U.S. PATENT DOCUMENTS

| 7,330,120 B2 * | 2/2008 | Malone | G01P 1/127 340/539.15 |
| 8,226,484 B2 * | 7/2012 | Bryant | A63F 13/24 436/36 |
| 2016/0269671 A1 * | 9/2016 | Choi | H04N 5/45 |

\* cited by examiner

*Primary Examiner* — K. Wong
(74) *Attorney, Agent, or Firm* — Kunzler, PC

(57) ABSTRACT

Apparatuses, methods, systems, and program products are disclosed for powering-on devices based on remote control movement. A method includes detecting, by a processor, that a remote control device is moving based on data from one or more sensors communicatively coupled to the remote control device. The method includes transmitting, wirelessly from the remote control device, a power-on signal to one or more information handling devices in response to the movement of the remote control device.

19 Claims, 4 Drawing Sheets

POWERING-ON DEVICES BASED ON REMOTE CONTROL MOVEMENT

FIELD

The subject matter disclosed herein relates to remote control devices and more particularly relates to transmitting power-on signals from a remote control device based on movement of the remote control device.

BACKGROUND

Remote controls can be used to wirelessly control various devices such as televisions, set-top boxes, stereo systems, gaming systems, and/or the like. Typically, when a device is powered-on using a remote control, the user presses a button on the remote to transmit the power-on and signal and then must wait some period of time while the device powers-on. During this time no feedback may be provided to the user, which may cause the user to wonder if the device is actually powering-on, if the device is on the correct input, if there is an issue with the connections between different devices, e.g., between a set-top box and a television, and/or the like.

BRIEF SUMMARY

An apparatus for powering-on devices based on remote control movement is disclosed. The apparatus, in one embodiment, includes a remote control device that wirelessly communicates with one or more information handling devices, one or more sensors communicatively coupled to the remote control device, a processor of the remote control device, and a memory that stores code executable by the processor. In one embodiment, the memory stores code executable by the processor to detect that the remote control device is moving based on data from the one or more sensors. In a further embodiment, the memory stores code executable by the processor to transmit, wirelessly from the remote control device, a power-on signal to the one or more information handling devices in response to the movement of the remote control device.

A method for powering-on devices based on remote control movement, in one embodiment, includes detecting, by a processor, that a remote control device is moving based on data from one or more sensors communicatively coupled to the remote control device. The method, in certain embodiments, includes transmitting, wirelessly from the remote control device, a power-on signal to one or more information handling devices in response to the movement of the remote control device.

A program product for powering-on devices based on remote control movement, in one embodiment, includes a computer readable storage medium that stores code executable by a processor. In some embodiments, the executable code includes code to perform detecting that a remote control device is moving based on data from one or more sensors communicatively coupled to the remote control device. The executable code, in certain embodiments, includes code to perform transmitting, wirelessly from the remote control device, a power-on signal to one or more information handling devices in response to the movement of the remote control device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
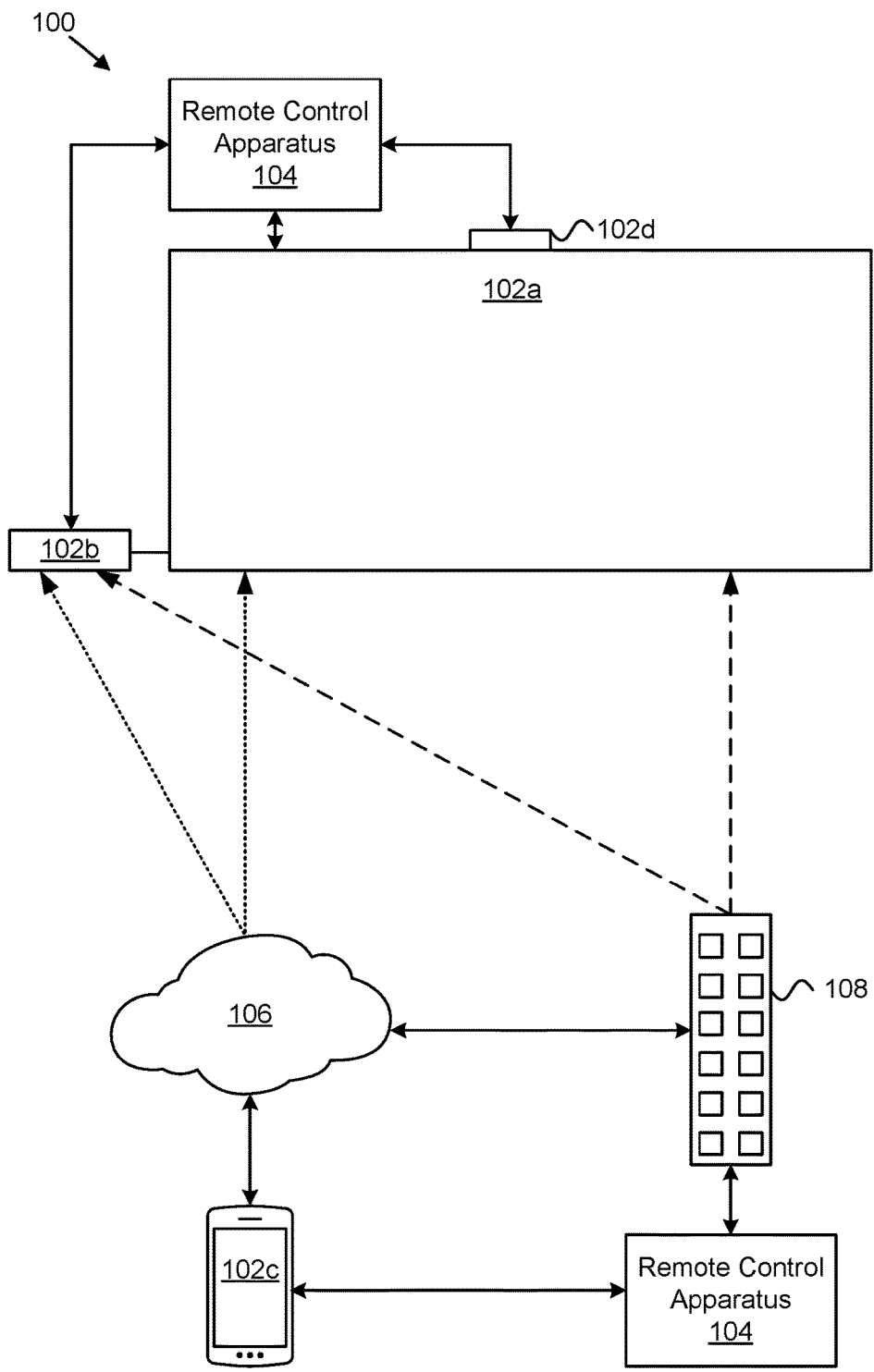
FIG. 1 is a schematic block diagram illustrating one embodiment of a system for powering-on devices based on remote control movement.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for powering-on devices based on remote control movement is disclosed. The apparatus, in one embodiment, includes a remote control device that wirelessly communicates with one or more information handling devices, one or more sensors communicatively coupled to the remote control device, a processor of the remote control device, and a memory that stores code executable by the processor. In one embodiment, the memory stores code executable by the processor to detect that the remote control device is moving based on data from the one or more sensors. In a further embodiment, the memory stores code executable by the processor to transmit, wirelessly from the remote control device, a power-on signal to the one or more information handling devices in response to the movement of the remote control device.

In one embodiment, the power-on signal is wirelessly transmitted from the remote control device in response to the movement of the remote control device satisfying a predetermined movement threshold. In a further embodiment, the predetermined movement threshold comprises a lift threshold associated with an amount of vertical movement of the remote control.

In certain embodiments, the memory stores code executable by the processor to determine an amount of time that the remote control device is moved such that the power-on signal is wirelessly transmitted from the remote control device in response to determining that the amount of time that the remote control device is moved satisfies a predetermined time threshold.

In one embodiment, the memory stores code executable by the processor to determine how the remote control device is being held in a user's hand such that the power-on signal is wirelessly transmitted from the remote control device in response to determining that the user is holding the remote control device in a manner that indicates that the user intends to use the remote control device.

In various embodiments, the memory stores code executable by the processor to determine a direction that the remote control device is pointing such that the power-on signal is wirelessly transmitted from the remote control device in response to determining that the remote control device is pointing at an information handling device of the one or more information handling devices.

In certain embodiments, the memory stores code executable by the processor to track usage data for the remote control device. In some embodiments, the usage data is selected from the group consisting of a day, a time of day, an amount of ambient light detected when the remote control device is moved, and/or one or more devices within a vicinity of the remote control device when it is moved.

In one embodiment, the power-on signal is wirelessly transmitted from the remote control device in response to the usage data indicating that the remote control device is typically used in its current context to turn on the one or more information handling devices. In certain embodiments, the one or more information handling devices comprises a display device and one or more other devices, and the power-on signal is wirelessly transmitted from the remote control device to the display device after the power-on signal has been wirelessly transmitted to each of the one or more other devices.

In a further embodiment, the power-on signal is wirelessly transmitted from the remote control device in response to detecting that the remote control device is disconnected from a continuous power supply. In some embodiments, the memory stores code executable by the processor to ignore one or more power-on signals manually initiated by a user interacting with the remote control device after the power-on signal has been wirelessly transmitted from the remote control device.

In one embodiment, the one or more sensors comprise one or more cameras of external devices that are communicatively coupled to the remote control device. The one or more cameras may be configured to capture images of the remote control device such that the power-on signal is wirelessly transmitted from the remote control device in response to the captured images indicating movement of the remote control device. In further embodiments, the one or more sensors are selected from the group comprising an accelerometer, a gyroscope, a motion sensor, and a touch sensor.

A method for powering-on devices based on remote control movement, in one embodiment, includes detecting, by a processor, that a remote control device is moving based on data from one or more sensors communicatively coupled to the remote control device. The method, in certain embodiments, includes transmitting, wirelessly from the remote control device, a power-on signal to one or more information handling devices in response to the movement of the remote control device.

In one embodiment, the power-on signal is wirelessly transmitted from the remote control device in response to the movement of the remote control device satisfying a predetermined movement threshold. The predetermined movement threshold may include a lift threshold associated with an amount of vertical movement of the remote control. In some embodiments, the method includes determining an amount of time that the remote control device is moved such that the power-on signal is wirelessly transmitted from the remote control device in response to determining that the amount of time that the remote control device is moved satisfies a predetermined time threshold.

In various embodiments, the method includes determining how the remote control device is being held in a user's hand such that the power-on signal is wirelessly transmitted from the remote control device in response to determining that the user is holding the remote control device in a manner that indicates that the user intends to use the remote control device.

In certain embodiments, the method includes determining a direction that the remote control device is pointing such that the power-on signal is wirelessly transmitted from the remote control device in response to determining that the remote control device is pointing at an information handling device of the one or more information handling devices.

In various embodiments, the one or more information handling devices comprises a display device and one or more other devices, and the power-on signal is wirelessly transmitted from the remote control device to the display device after the power-on signal has been wirelessly transmitted to each of the one or more other devices.

A program product for powering-on devices based on remote control movement, in one embodiment, includes a computer readable storage medium that stores code executable by a processor. In some embodiments, the executable code includes code to perform detecting that a remote control device is moving based on data from one or more sensors communicatively coupled to the remote control device. The executable code, in certain embodiments, includes code to perform transmitting, wirelessly from the remote control device, a power-on signal to one or more information handling devices in response to the movement of the remote control device.

FIG. 1 is a schematic block diagram illustrating one embodiment of a system 100 for powering-on devices based on remote control movement. In one embodiment, the system 100 includes one or more information handling devices 102a-d (collectively 102), one or more remote control apparatuses 104, one or more data networks 106, and one or more remote control devices 108. In certain embodiments, even though a specific number of information handling devices 102, remote control apparatuses 104, data networks 106, and remote control devices 108 are depicted in FIG. 1, one of skill in the art will recognize, in light of this disclosure, that any number of information handling devices 102, remote control apparatuses 104, data networks 106, and remote control devices 108 may be included in the system 100.

In one embodiment, the system 100 includes one or more information handling devices 102. The information handling devices 102 may include one or more of a display device 102a, e.g., a television; a set-top box 102b, e.g., a streaming device such as an Apple TV®, Amazon Fire®, Roku® player, and/or the like, a gaming console such as an Xbox®, a PlayStation®, and/or the like, a cable or satellite receiver, a surround sound receiver, and/or the like; a smart phone or tablet device 102c, and/or a camera 102d. Other information handling devices 102 that may be, a desktop computer, a laptop computer, a smart speaker (e.g., Amazon Echo®, Google Home®, Apple HomePod®), a security system, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium. In some embodiments, the information handling devices 102 have a start-up or warm-up period from the time that the devices 102 are powered-on to when the devices are operable. The start-up period may last from a few seconds to a few minutes.

In certain embodiments, the information handling devices 102 can be operated using remote control devices 108. For instance, the remote control devices 108 may be used to turn devices 102 on/off, change volume settings, change channel settings, change inputs, and/or other functions and features. The remote control devices 108 may wirelessly transmit various signals, such as power-on signals, to the information handling devices 102 to control the information handling devices 102. The remote control devices 108 may communicate wirelessly with devices 102 using radio frequency ("RF") signals, or the like. Similarly, a remote control device 108 may in communication with a device 102 via a data network 106, such as a Wi-Fi network, a Bluetooth® connection, and/or the like, and may send control signals to the devices 102 wirelessly via the network 106.

In certain embodiments, the remote control device 108 may include a remote control device 108 that corresponds to a particular device 102, e.g., is shipped or sold with the device 102, a programmable remote control device, a game controller, e.g., a PlayStation® or Xbox® controller, and/or the like. In some embodiments, a single remote control device 108 may control multiple different information handling devices 102. In certain embodiments, the remote control device 108 may be embodied as an application executing on a smart phone 102c, or the like, that is communicatively coupled to a device 102 via the data network 106. In such an embodiment, the remote control device 108 may be embodied as a virtual or "soft" remote control such that the functions of the remote control are controlled using the remote application on the smart phone 102c, or the like.

In some embodiments, the remote control device 108 is communicatively coupled to one or more sensors. For instance, the remote control device 108 may include sensors for detecting motion, position, acceleration, and/or the like such as accelerometers, gyroscopes, motion sensors, proximity sensors, and/or the like. In certain embodiments, the remote control device 108 may include sensors that detect a user holding the device such as touch sensors, capacitance sensors, proximity sensors, and/or the like. The remote control device 108 may be communicatively coupled to external sensors such as the camera 102d, and/or the like. The remote control device 108 may include sensors for detecting wireless signals emitted from other devices such as Wi-Fi signal sensors, Bluetooth® signal sensors, near-field communication ("NFC") signal sensors, RF signal sensors, infrared signal sensors, and/or the like.

In one embodiment, the remote control apparatus 104 is configured to detect that a remote control device 108 is moving based on data from one or more sensors communicatively coupled to the remote control device 108, and transmit, wirelessly from the remote control device 108, a power-on signal to one or more information handling devices 102 in response to the movement of the remote control device 108. The remote control apparatus 104, including its various sub-modules, may be located on one or more information handling devices 102 in the system 100, one or more servers 108, one or more network devices, and/or the like. The remote control apparatus 104 is described in more detail below with reference to FIGS. 2 and 3.

In one embodiment, the remote control apparatus 104 provides a solution over conventional remote control devices 108 by detecting the motion of the remote and pre-emptively or proactively sending a power-on signal to devices 102 that the remote control device 108 can control without waiting or requiring the user to press one or more buttons on the remote control device 108 to transmit the same power-on signals. In this manner, the remote control apparatus 104 decreases the time that the user has to wait for devices 102 to start up by sending the power-on signal to the devices 102 based on movement of the remote control device 108 before the user presses a button to manually transmit the power-on signal.

In various embodiments, the remote control apparatus 104 may be embodied as a hardware appliance that can be installed or deployed on an information handling device 102, on a remote control device 108, or elsewhere on the data network 106. In certain embodiments, at least a portion of the remote control apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the remote control apparatus 104 may include a power interface, a wired and/or wireless network interface, a graphical interface that attaches to a display, and/or a semiconductor integrated circuit device as described below, configured to perform the functions described herein with regard to the remote control apparatus 104.

The remote control apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the remote control apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the remote control apparatus 104.

The semiconductor integrated circuit device or other hardware appliance of the remote control apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the remote control apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

Figure 2:
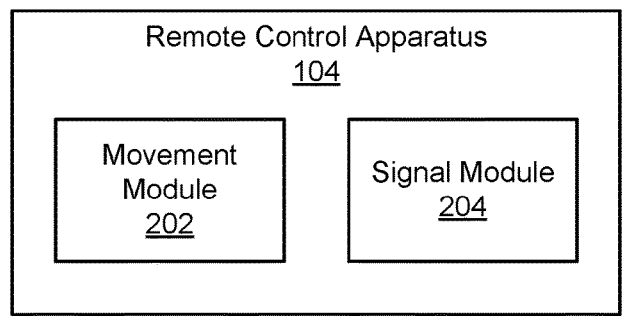
FIG. 2 is a schematic block diagram illustrating one embodiment of an apparatus for powering-on devices based on remote control movement.

FIG. 2 is a schematic block diagram illustrating one embodiment of an apparatus 200 for powering-on devices based on remote control movement. In one embodiment, the apparatus 200 includes an embodiment of a remote control apparatus 104. The remote control apparatus 104, in some embodiments, includes one or more of a movement module 202 and a signal module 204, which are described in more detail below.

In one embodiment, the movement module 202 is configured to detect that a remote control device 108 is moving. In various embodiments, the movement module 202 uses data from one or more sensors that are communicatively coupled to the remote control device 108. For example, the movement module 202 may use data from an accelerometer that is built into the remote control device 108 to detect that the remote control device 108 is moving, e.g., in response to a user picking up the remote control device 108. Other sensors may include distance sensors (e.g., laser, sonar, lidar, and/or ultrasonic rangefinders), gyroscopes, motion sensors, and/or the like.

In certain embodiments, the one or more sensors includes one or more external sensors that are in communication with the remote control device 108, e.g., with the movement module 202, but are not integrated with or built into the remote control device 108. For instance, the remote control device 108, e.g., the movement module 202, may be in communication with a camera 102d and may receive and process image data that indicates that the remote control device 108 is moving, is being held in a user's hand in a manner that indicates that the user intends to use the remote control device 108, e.g., that it is pointed towards the information handling devices 102, and/or the like. Other external sensors may include IR sensors that detect IR signals from the remote control device 108, motion sensors, proximity sensors, and/or the like. The remote control device 108, e.g., the movement module 202, may receive the sensor data from the external sensors via a data network 106.

In one embodiment, the signal module 204 is configured to wirelessly transmit from the remote control device 108 a power-on signal to one or more information handling devices 102 in response to the movement of the remote control device 108. For example, in response to the movement module 202 detecting that the remote control device 108 is moving, the signal module 204 may transmit a power-on signal, e.g., an IR signal, to a television and a streaming box so that the devices can begin the start-up process before the user presses a button to manually power-on the television and the streaming box and/or without requiring the user to press a button to manually power-on the devices. In some embodiments, the signal module 204 transmits a power-off signal if the information handling devices 102 are already powered-on. In another embodiment, if the information handling devices 102 are already powered-on, the signal module 204 may not transmit a power-off signal to the information handling devices 102.

In one embodiment, the signal module 204 wirelessly transmits a power-on signal to one or more devices 102 in response to determining that the movement of the remote control device 108 satisfies a predetermined movement threshold. For instance the signal module 204 and/or the movement module 202, may determine whether the amount of movement of the remote control device 108 satisfies a vertical "lift" threshold, a horizontal threshold, and/or the like using data from sensors, e.g., gyroscopes, accelerometers, distance sensors, and/or the like, of the remote control device 108, which may indicate that the user intends to use the remote control device 108 and is not simply moving it to clean or has otherwise inadvertently moved the remote control device 108 without the intent to use the remote control device 108.

In one embodiment, if the information handling devices 102 that are controlled by the remote control device 108 include a display device such as a television, the signal module 204 transmits the power-on signal to one or more other devices that are connected to the display device before transmitting the power-on signal to the display device. For example, if the remote control device 108 is used to control a television and a streaming box, the signal module 204 may send a power-on signal to the streaming box before sending a power-on signal to the television so that the streaming box can begin its startup process and be ready to transmit data to the television while the television is starting up. In this manner, when the television starts up, a user will be presented with content from the streaming box instead of being presented with a blank screen until the streaming box has started up.

In one embodiment, the remote control device 108 may include rechargeable batteries, or a similar power source, that can be recharged using a continuous power source such as power provided from a wall outlet, e.g., via a USB cable, a cradle that the remote control device 108 sits in to recharge, and/or the like. In such an embodiment, the signal module 204 may detect that the remote control device 108 is removed from the continuous power supply, e.g., by monitoring the power settings of the remote control device 108, by detecting that the remote control device 108 switched to battery power, and/or the like, and, together with the movement that the movement module 202 detects, determine that the user intends to use the remote control device 108 and wirelessly transmit a power-on signal to information handling devices 102.

In some embodiments, the signal module 204 ignores one or more power-on signals that are manually initiated by a user that is interacting with the remote control device 108 after the signal module 204 has transmitted one or more power-on signals from the remote control device 108 in response to the movement of the remote control device 108. For instance, when the user picks up a remote control device 108 to turn on a television, the movement module 202 may detect the remote control device's 108 movement and the signal module 204 may wirelessly transmit power-on signals to devices 102 that the remote control device 108 controls. However, when the user picks up the remote control device 108, the user may press one or buttons to turn on one or more devices 102 that the remote control device 108 controls after the signal module 204 has already transmitted one or more power-on signals. In such an embodiment, the signal module 204 ignores the power-on signals that the user manually initiated by interacting with the remote control device 108 so that the power-on signals are not sent again (which may turn off the devices 102 after the signal module 204 transmits the power-on signals to turn the devices 102 on).

Figure 3:
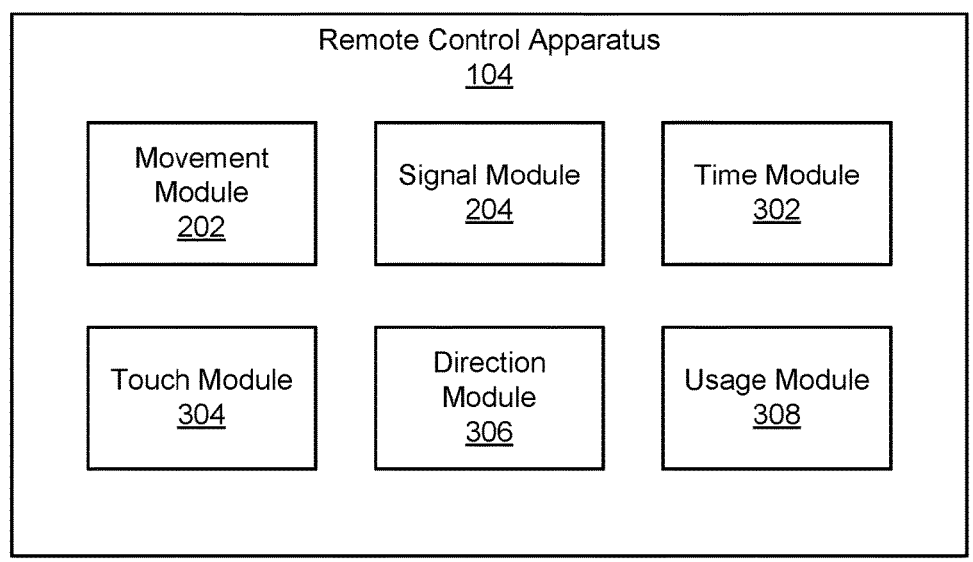
FIG. 3 is a schematic block diagram illustrating one embodiment of another apparatus for powering-on devices based on remote control movement.

FIG. 3 is a schematic block diagram illustrating one embodiment of an apparatus 300 for powering-on devices based on remote control movement. In one embodiment, the apparatus 300 includes an embodiment of a remote control apparatus 104. The remote control apparatus 104, in some embodiments, includes one or more of a movement module 202 and a signal module 204, which may be substantially similar to the movement module 202 and the signal module 204 described above with reference to FIG. 2. In a further embodiment, the remote control apparatus 104 includes one or more of a time module 302, a touch module 304, a direction module 306, and a usage module 308, which are described in more detail below.

In one embodiment, the time module 302 is configured to determine an amount of time that the remote control device 108 is moved. The signal module 204, in certain embodiments, wirelessly transmits the power-on signal from the remote control device 108 in response to determining that the amount of time that the remote control device 108 is moved satisfies a predetermined time threshold.

For instance, the time module 302 may start a timer when the movement module 202 detects that the remote control device 108 is moving. The time module 302 may run the time until the remote control device 108 stops moving, or when the movement of the remote control device 108 is substantially negligible, or otherwise below a movement threshold. If the amount of time between when the timer is started and stopped satisfies a time threshold, then the signal module 204 may determine that the user is moving the remote control device 108 with the intent to use the remote control device 108 and is not repositioning the remote control device 108 on a table, inadvertently bumping the remote control device 108, or otherwise moving the remote control device 108 without the intention of using the remote control device 108 to control information handling devices 102.

In one embodiment, the touch module 304 is configured to determine how the remote control device 108 is being held in a user's hand. In certain embodiments, the power-on signal is wirelessly transmitted from the remote control device 108 in response to determining that the user is holding the remote control device 108 in a manner that indicates that the user intends to use the remote control device 108. For instance, the touch module 304 may use data from one or more touch sensors, e.g., capacitance sensors, pressure sensors, and/or the like, on the surface of the remote control device 108 to detect the placement of the user's fingers on the remote control device 108 to determine how the user is holding the remote control device 108 in his hand.

The touch module 304, for example, may determine that the user is holding the remote control device 108 is his right hand, with his fingers wrapped around the remote control device 108 and the thumb hovering above the remote control device 108 in a position to press buttons on the remote control device 108. In such an embodiment, the signal module 204 may wirelessly transmit the power-on signal. On the other hand, if the touch module 304 determines that the user is holding the remote control device 108 between two fingers and a thumb, e.g., to pick-up the remote control device 108 and move it to another location, then the touch module 204 may determine that the user is holding the remote control device 108 in a manner that the remote control device 108 is not intended to be used, and the signal module 204 may not transmit the power-on signal.

The direction module 306, in one embodiment, is configured to determine a direction that the remote control device 108 is pointing based on one or more sensors for the remote control device 108. For instance, the direction module 306 may determine, based on data from a gyroscope integrated with the remote control device 108 and/or image data from a camera of an information handling device 102 that the remote control device 108 controls, that the remote control device 108 is pointing in a direction of the information handling device 102, which may indicate that the user intends to use the remote control device 108 to control the information handling device 102.

The usage module 308, in one embodiment, is configured to track usage data for the remote control device 108. For instance, the usage module 308 may track when the remote control device 108 is used, the conditions under which the remote control device 108 is used, e.g., the time of day when the remote control device 108 is used/moved, other devices that are within a vicinity/proximity of the remote control device 108 when the remote control device 108 is used/moved (e.g., other wireless devices of other users), the ambient light conditions (e.g., based on input from light sensors) when the remote control device 108 is used/moved, and/or the like.

In one embodiment, the signal module 204 wirelessly transmits the power-on signal when movement of the remote control device 108 is detected in response to the usage data indicating that the remote control device 108 is typically used in its current context to turn on the one or more information handling devices 102. For example, if the usage data indicates that the remote control device 108 is typically used/moved every evening between 7:00 PM and 10:00 PM, and the movement module 202 detects that the remote control device 108 is being moved at 7:15 PM, then the signal module 204 may transmit the power-on signal based on the usage data indicating that the remote control device 108 is typically used at 7:15 PM. Similarly, if the usage module 308 detects wireless devices within a proximity of the remote control device 108 that are typically present when the remote control device 108 is used (e.g., other family member's devices), then the signal module 204 may transmit the power-on signal based on the usage data indicating that the remote control device 108 is typically used at when some or all of the detected wireless devices are present.

Figure 4:
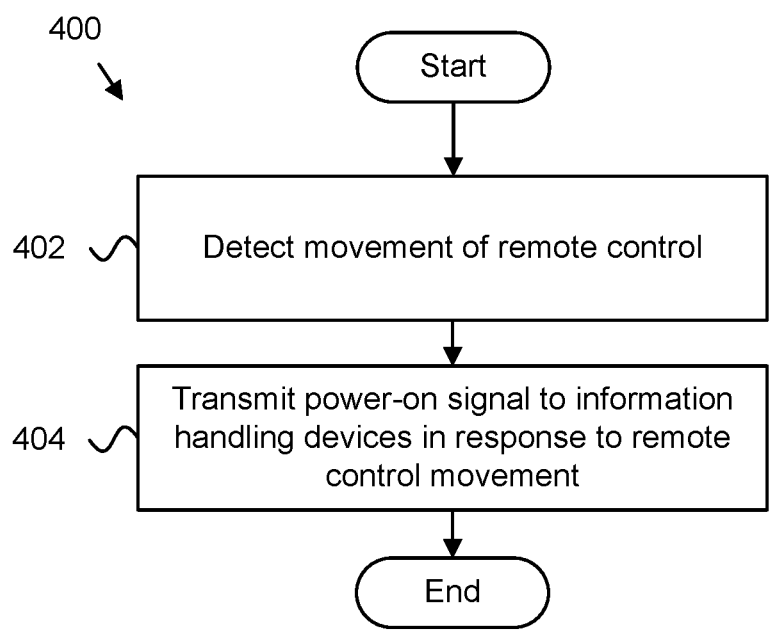
FIG. 4 is a schematic flow chart diagram illustrating one embodiment of a method for powering-on devices based on remote control movement.

FIG. 4 is a schematic flow chart diagram illustrating one embodiment of a method 400 for powering-on devices based on remote control movement. In one embodiment, the method 400 begins and the movement module 202 detects 402 that a remote control device 108 is moving based on data from one or more sensors communicatively coupled to the remote control device 108. In further embodiments, the signal module 204 transmits 404, wirelessly from the remote control device 108, a power-on signal to one or more information handling devices 102 in response to the movement of the remote control device 108, and the method 400 ends.

Figure 5:
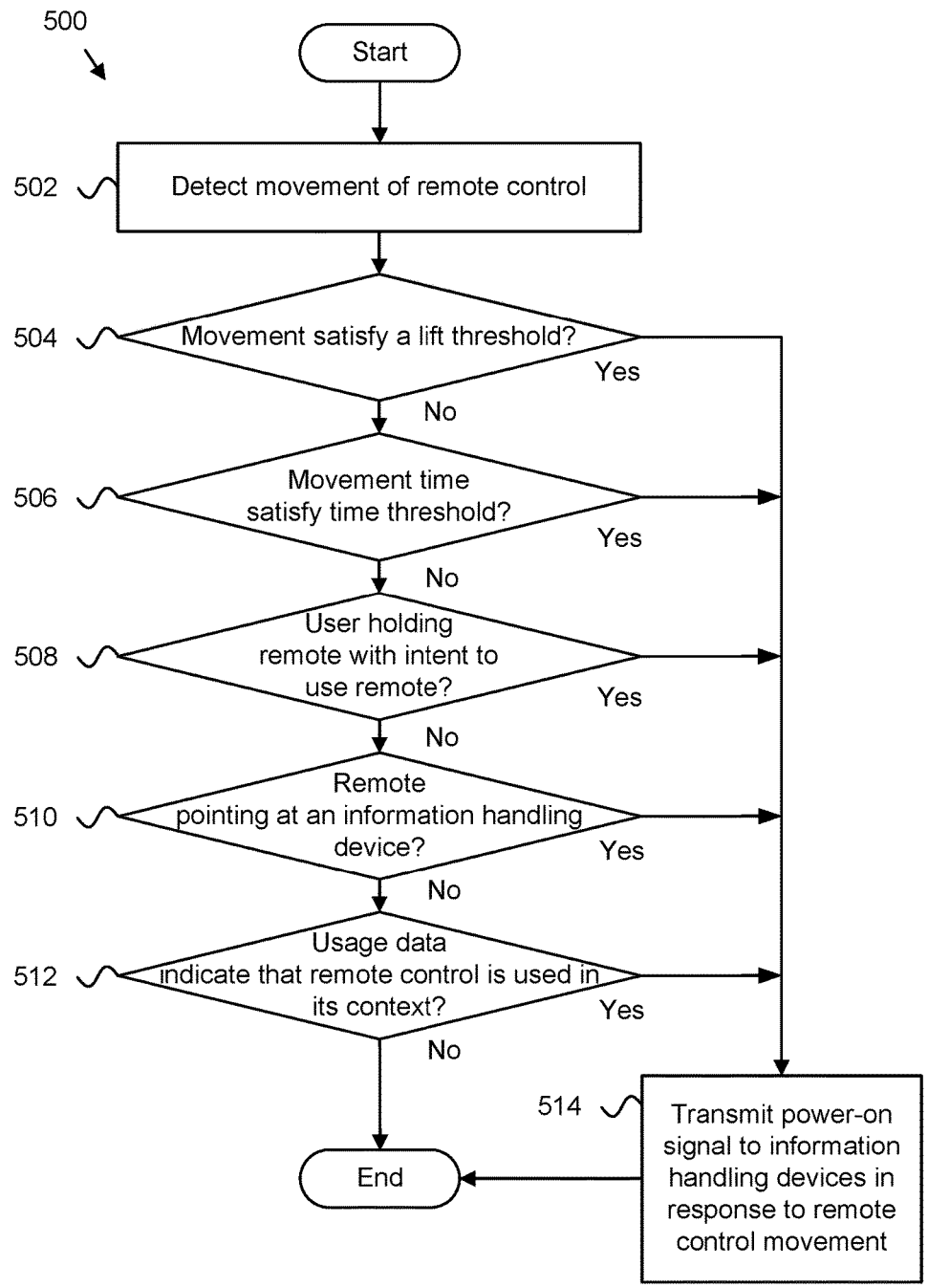
FIG. 5 is a schematic flow chart diagram illustrating one embodiment of another method for powering-on devices based on remote control movement.

FIG. 5 is a schematic flow chart diagram illustrating one embodiment of another method 500 for powering-on devices based on remote control movement. In one embodiment, the method 500 begins and the movement module 202 detects 502 that a remote control device 108 is moving based on data from one or more sensors communicatively coupled to the remote control device 108. In a further embodiment, the movement module 202 determines 504 whether the movement of the remote control device 108 satisfies a "lift" threshold, e.g., a vertical movement threshold. If so, the signal module 204 transmits 514, wirelessly from the remote control device 108, a power-on signal to one or more information handling devices 102 in response to the movement of the remote control device 108, and the method 500 ends.

Otherwise, the time module 302 determines 506 whether the amount of time that the remote control device 108 is moved satisfies a time threshold. If so, the signal module 204 transmits 514, wirelessly from the remote control device 108, a power-on signal to one or more information handling devices 102 in response to the movement of the remote control device 108, and the method 500 ends.

Otherwise, the touch module 304 determines 508 whether the user is holding the remote control device 108 in such a way that indicates that the user intends to use the remote control device 108 to control one or more information handling devices 102. If so, the signal module 204 transmits 514, wirelessly from the remote control device 108, a power-on signal to one or more information handling devices 102 in response to the movement of the remote control device 108, and the method 500 ends.

Otherwise, the direction module 306 determines 510 whether the user is pointing the remote control device 108 in a direction of the information handling devices 102, which may indicate that the user intends to use the remote control device 108 to control one or more information handling devices 102. If so, the signal module 204 transmits 514, wirelessly from the remote control device 108, a power-on signal to one or more information handling devices 102 in response to the movement of the remote control device 108, and the method 500 ends.

Otherwise, the usage module 308 determines 512 whether the current context that the remote control device 108 is being moved under (e.g., the day, the time of day, the ambient light levels, and/or the presence of other wireless devices) is similar to previously tracked contexts that the remote control device 108 is used under. If so, the signal module 204 transmits 514, wirelessly from the remote control device 108, a power-on signal to one or more information handling devices 102 in response to the movement of the remote control device 108, and the method 500 ends. Otherwise, the method 500 ends.

Embodiments may be practiced in other specific forms. The described embodiments are to be considered in all respects only as illustrative and not restrictive. The scope of the subject matter disclosed herein is, therefore, indicated by the appended claims rather than by the foregoing description. All changes which come within the meaning and range of equivalency of the claims are to be embraced within their scope.

What is claimed is:

1. An apparatus comprising:
a remote control device that wirelessly communicates with one or more information handling devices;
one or more sensors communicatively coupled to the remote control device;
a processor of the remote control device; and
a memory that stores code executable by the processor to:
detect that the remote control device is moving based on data from the one or more sensors; and
transmit, wirelessly from the remote control device, a power-on signal to the one or more information handling devices in response to the movement of the remote control device satisfying a predetermined movement threshold.

2. The apparatus of claim 1, wherein the predetermined movement threshold comprises a lift threshold associated with an amount of vertical movement of the remote control.

3. The apparatus of claim 1, further comprising code executable by the processor to determine an amount of time that the remote control device is moved, wherein the power-on signal is wirelessly transmitted from the remote control device in response to determining that the amount of time that the remote control device is moved satisfies a predetermined time threshold.

4. The apparatus of claim 1, further comprising code executable by the processor to determine how the remote control device is being held in a user's hand, wherein the power-on signal is wirelessly transmitted from the remote control device in response to determining that the user is holding the remote control device in a manner that indicates that the user intends to use the remote control device.

5. The apparatus of claim 1, further comprising code executable by the processor to determine a direction that the remote control device is pointing, wherein the power-on signal is wirelessly transmitted from the remote control device in response to determining that the remote control device is pointing at an information handling device of the one or more information handling devices.

6. The apparatus of claim 1, further comprising code executable by the processor to track usage data for the remote control device, the usage data selected from the group consisting of a day, a time of day, an amount of ambient light detected when the remote control device is moved, and/or one or more devices within a vicinity of the remote control device when it is moved.

7. The apparatus of claim 6, wherein the power-on signal is wirelessly transmitted from the remote control device in response to the usage data indicating that the remote control device is typically used in its current context to turn on the one or more information handling devices.

8. The apparatus of claim 1, wherein the one or more information handling devices comprises a display device and one or more other devices, and the power-on signal is wirelessly transmitted from the remote control device to the display device after the power-on signal has been wirelessly transmitted to each of the one or more other devices.

9. The apparatus of claim 1, wherein the power-on signal is wirelessly transmitted from the remote control device in response to detecting that the remote control device is disconnected from a continuous power supply.

10. The apparatus of claim 1, further comprising code executable by the processor to ignore one or more power-on signals manually initiated by a user interacting with the remote control device after the power-on signal has been wirelessly transmitted from the remote control device.

11. The apparatus of claim 1, wherein the one or more sensors comprise one or more cameras of external devices that are communicatively coupled to the remote control device, the one or more cameras capturing images of the remote control device, wherein the power-on signal is wirelessly transmitted from the remote control device in response to the captured images indicating movement of the remote control device.

12. The apparatus of claim 1, wherein the one or more sensors are selected from the group comprising an accelerometer, a gyroscope, a motion sensor, and a touch sensor.

13. A method comprising:
detecting, by a processor, that a remote control device is moving based on data from one or more sensors communicatively coupled to the remote control device; and
transmitting, wirelessly from the remote control device, a power-on signal to one or more information handling devices in response to the movement of the remote control device satisfying a predetermined movement threshold.

14. The method of claim 13, wherein the predetermined movement threshold comprises a lift threshold associated with an amount of vertical movement of the remote control.

15. The method of claim 13, further comprising determining an amount of time that the remote control device is moved, wherein the power-on signal is wirelessly transmitted from the remote control device in response to determining that the amount of time that the remote control device is moved satisfies a predetermined time threshold.

16. The method of claim 13, further comprising determining how the remote control device is being held in a user's hand, wherein the power-on signal is wirelessly transmitted from the remote control device in response to determining that the user is holding the remote control device in a manner that indicates that the user intends to use the remote control device.

17. The method of claim 13, further comprising determining a direction that the remote control device is pointing, wherein the power-on signal is wirelessly transmitted from the remote control device in response to determining that the remote control device is pointing at an information handling device of the one or more information handling devices.

18. The method of claim 13, wherein the one or more information handling devices comprises a display device and one or more other devices, and the power-on signal is wirelessly transmitted from the remote control device to the display device after the power-on signal has been wirelessly transmitted to each of the one or more other devices.

19. A program product comprising a computer readable storage medium that stores code executable by a processor, the executable code comprising code to perform:
detecting that a remote control device is moving based on data from one or more sensors communicatively coupled to the remote control device; and
transmitting, wirelessly from the remote control device, a power-on signal to one or more information handling devices in response to the movement of the remote control device satisfying a predetermined movement threshold.

* * * * *